US012647816B2

(12) United States Patent
Yoshikawa

(10) Patent No.: US 12,647,816 B2
(45) Date of Patent: Jun. 2, 2026

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Yuki Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 18/363,307

(22) Filed: Aug. 1, 2023

(65) Prior Publication Data

US 2023/0379748 A1 Nov. 23, 2023

Related U.S. Application Data

(63) Continuation of application No. PCT/JP2021/041704, filed on Nov. 12, 2021.

(30) Foreign Application Priority Data

Feb. 5, 2021 (JP) ................................. 2021-017738

(51) Int. Cl.
*H04W 28/02* (2009.01)
*H04W 72/044* (2023.01)
(Continued)

(52) U.S. Cl.
CPC ..... *H04W 28/0252* (2013.01); *H04W 72/044* (2013.01); *H04W 76/25* (2018.02); *H04W 84/12* (2013.01)

(58) Field of Classification Search
CPC . H04W 76/15; H04W 76/25; H04W 28/0252; H04W 28/0289; H04W 72/20;
(Continued)

(56) References Cited

U.S. PATENT DOCUMENTS

2013/0329585 A1 12/2013 Okada
2015/0341880 A1 11/2015 Seok
(Continued)

FOREIGN PATENT DOCUMENTS

EP 3790346 A1 3/2021
JP 2013255059 A 12/2013
(Continued)

OTHER PUBLICATIONS

Insun Jang et al., Considerations for Multi-link Channel Access Without Simultaneous TX/RX Capability, doc.: IEEE 802.11-19/1917r0, Nov. 11, 2019.
(Continued)

*Primary Examiner* — Jianye Wu
(74) *Attorney, Agent, or Firm* — Canon U.S.A., Inc. IP Division

(57) ABSTRACT

A communication apparatus, compliant with an IEEE 802.11 series standard, that is capable of performing multi-link communication with an other communication apparatus using a plurality of links having different frequency channels, receives, a first frame from the other communication apparatus through a first link among the plurality of links, obtains, based on the first frame, information on a reception timing, of a predetermined interval, in the communication apparatus for the first frame transmitted from the other communication apparatus, and transmits a second frame through a second link among the plurality of links. The communication apparatus does not transmit the second frame in a period including the reception timing, and transmits the second frame through the second link in response to the first frame being received.

17 Claims, 10 Drawing Sheets

(51) Int. Cl.
H04W 76/25 (2018.01)
H04W 84/12 (2009.01)

(58) Field of Classification Search
CPC ............. H04W 72/044; H04W 56/001; H04W 74/0808; H04W 84/12; H04L 45/24; H04L 47/28
See application file for complete search history.

(56) References Cited

U.S. PATENT DOCUMENTS

| | | | | |
|---|---|---|---|---|
| 2021/0377856 A1* | 12/2021 | Chu | .................. | H04W 52/0216 |
| 2023/0146138 A1* | 5/2023 | Asterjadhi | ........ | H04W 52/0219 |
| | | | | 370/311 |

FOREIGN PATENT DOCUMENTS

| | | |
|---|---|---|
| JP | 2015510350 A | 4/2015 |
| JP | 2018050133 A | 3/2018 |

OTHER PUBLICATIONS

Jason Yuchen Guo (Huawei Technologies) et al., "Multi Link Group Addressed Frame delivery for non-STR MLD", IEEE802.11-20/0761r2, [online], Nov. 25, 2020, slides 1-6, [retrieved on Jan. 17, 2022], <URL:https://mentor.ieee.org/802.11/dcn/20/11-20-0761-02-00be-multi-link-group-addressed-frame-delivery-for-non-str-mld.pptx>.

* cited by examiner

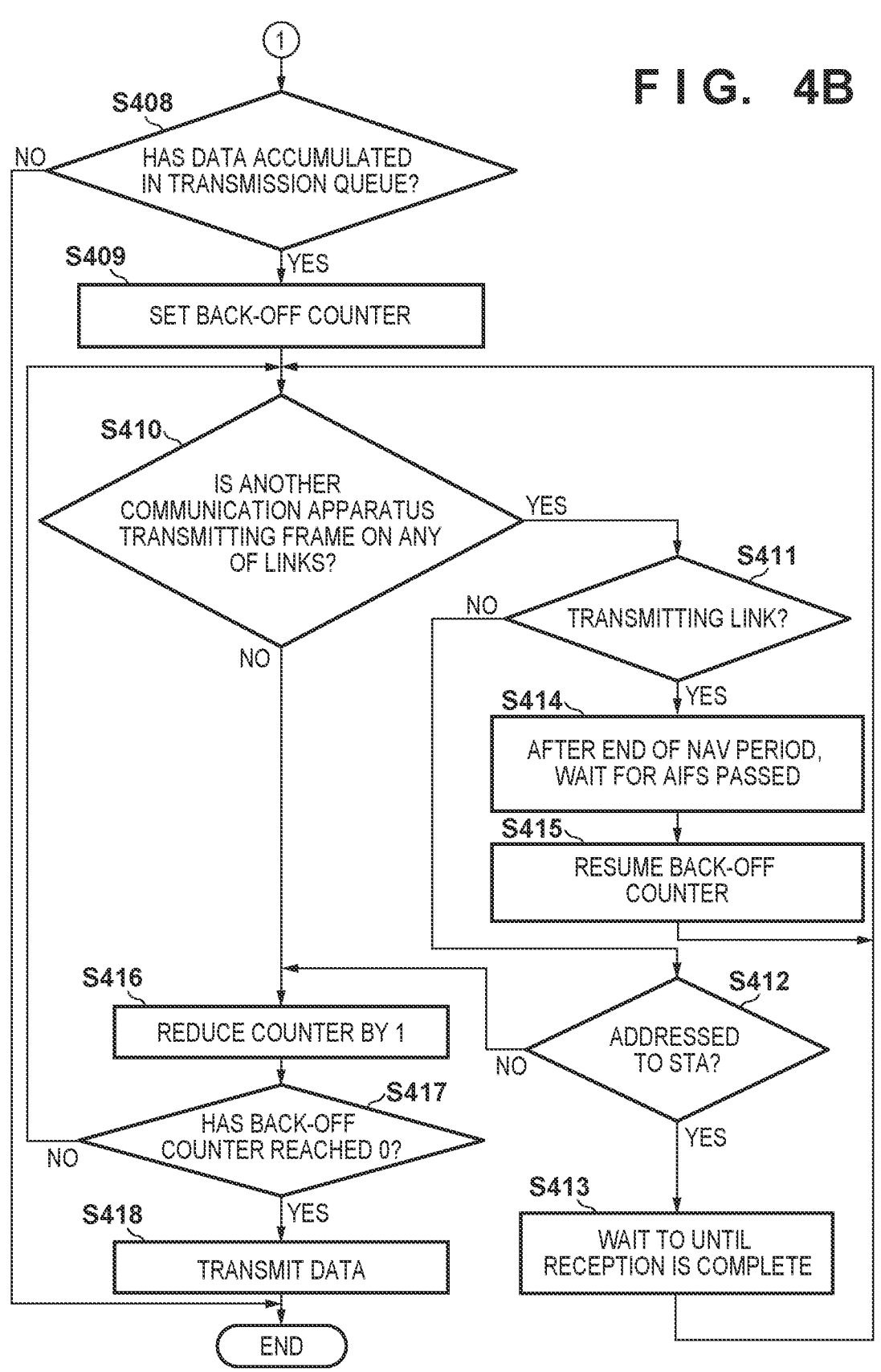
F I G. 4B

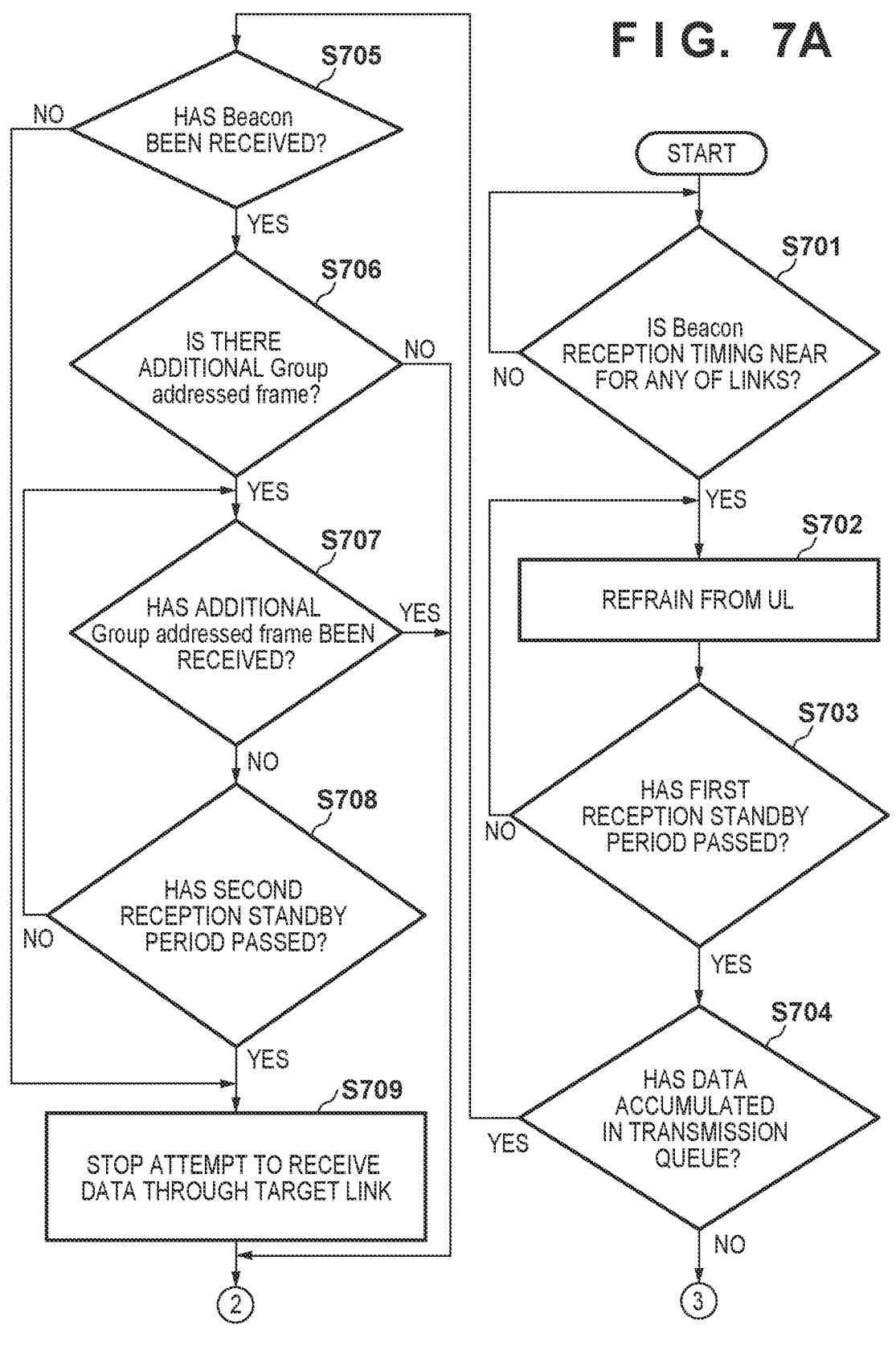
F I G. 7A

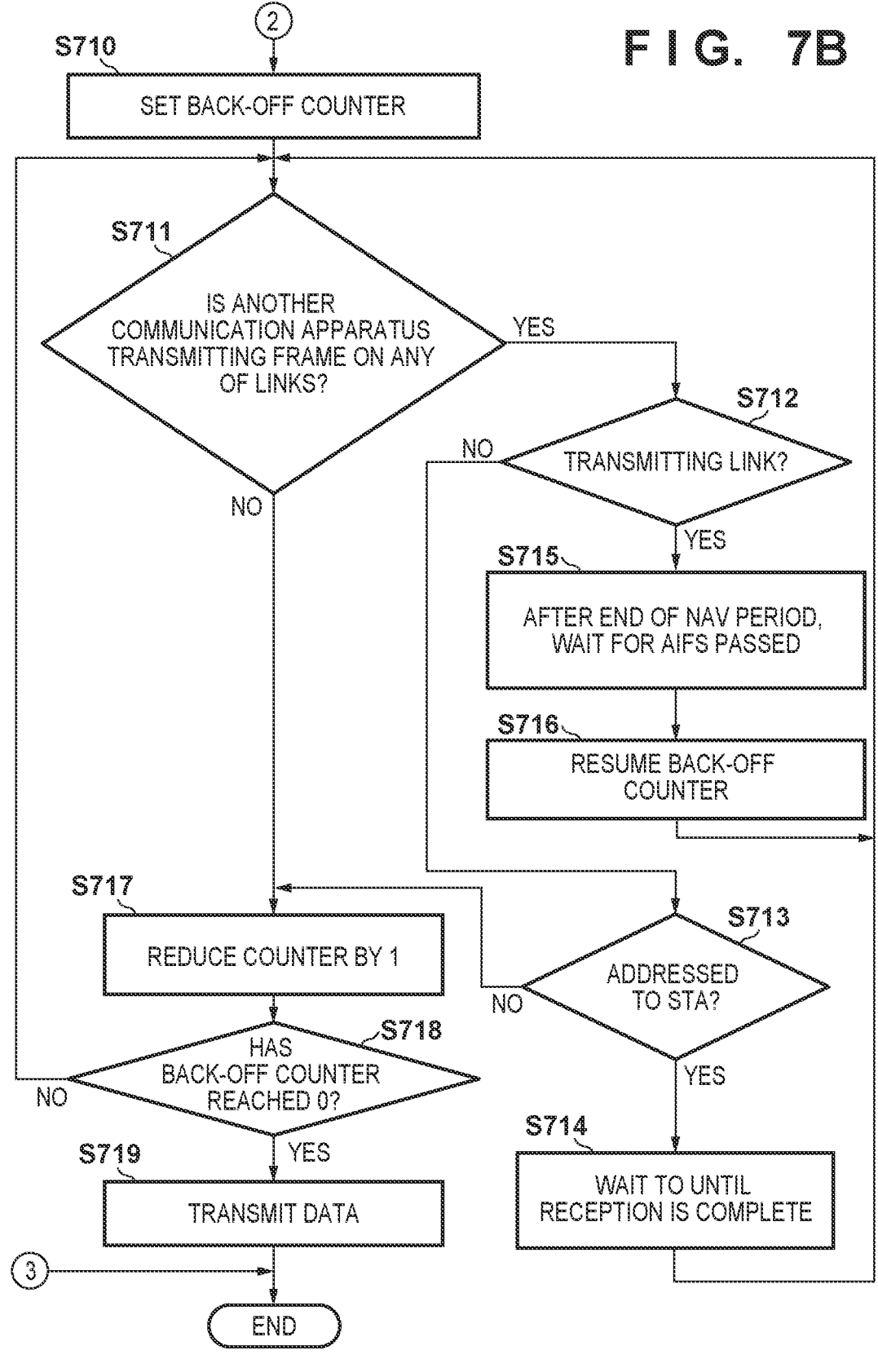
F I G.  7B

F I G. 8
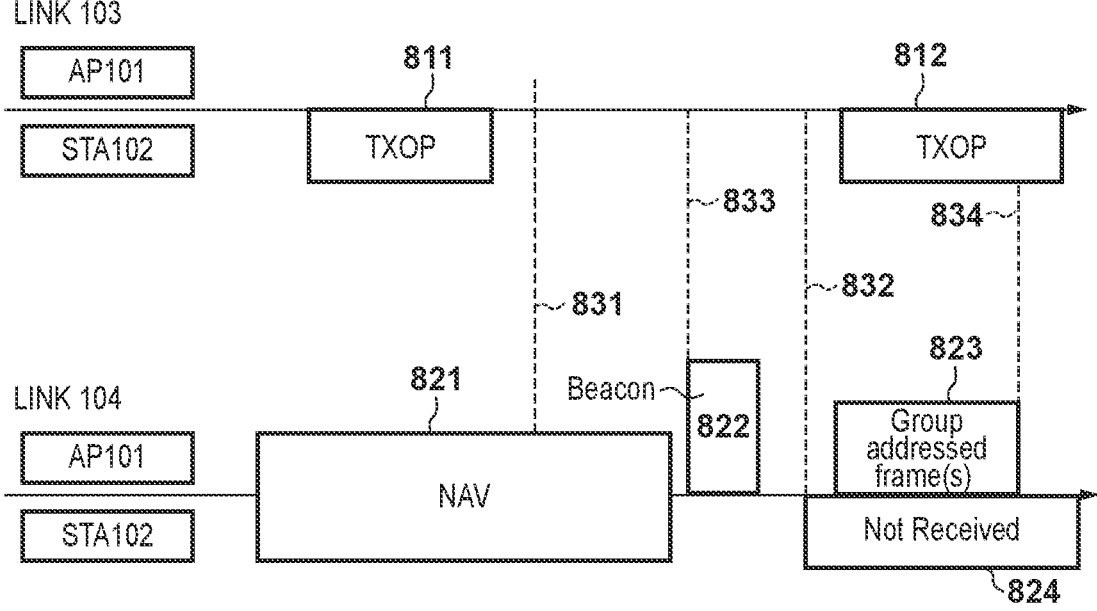
F I G. 9
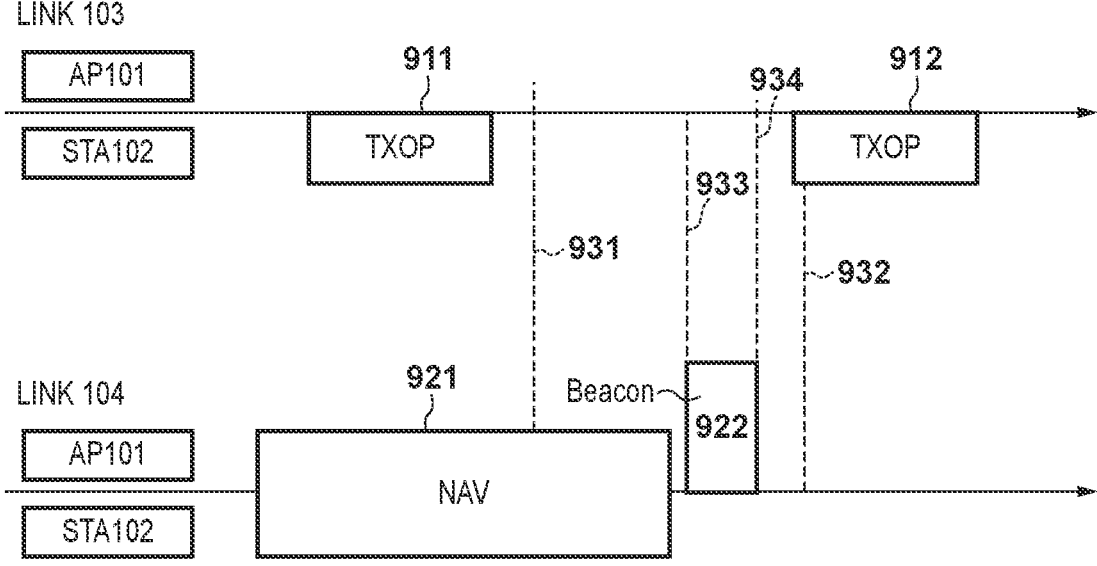

F I G.  12
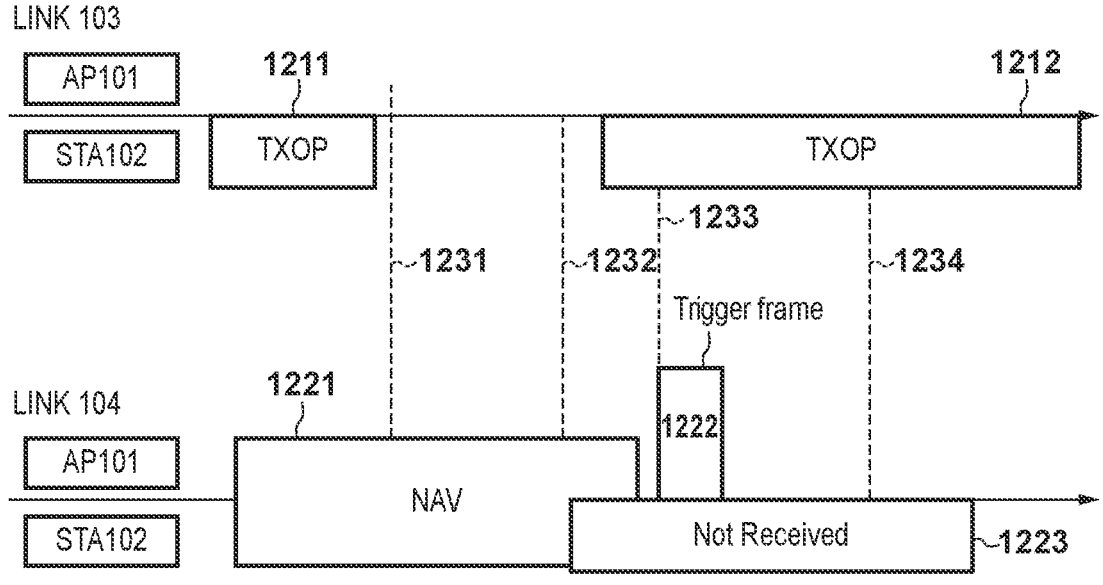
F I G.  13
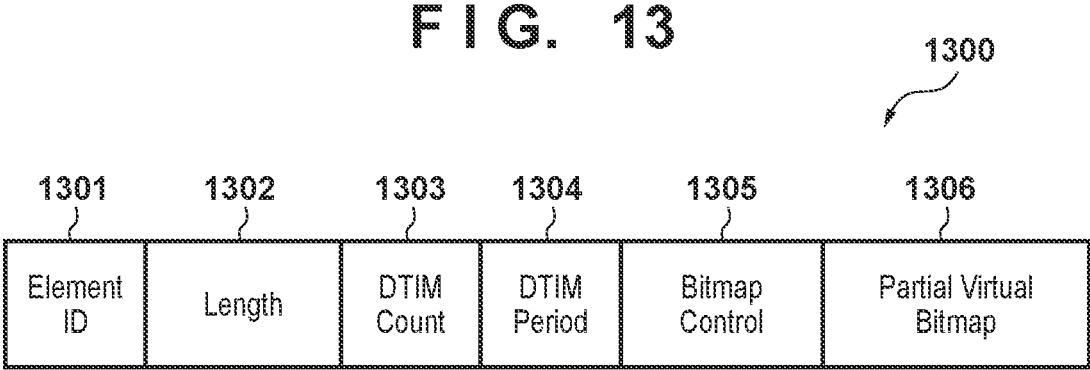

COMMUNICATION APPARATUS, CONTROL METHOD FOR COMMUNICATION APPARATUS, AND STORAGE MEDIUM

CROSS-REFERENCE TO RELATED APPLICATIONS

This application is a Continuation of International Patent Application No. PCT/JP2021/041704, filed Nov. 12, 2021, which claims the benefit of Japanese Patent Application No. 2021-017738, filed Feb. 5, 2021, both of which are hereby incorporated by reference herein in their entireties.

BACKGROUND OF THE INVENTION

Field of the Invention

The present invention relates to wireless communication techniques.

Background Art

With the increase in the amount of data communicated in recent years, the development of communication technologies such as wireless LAN (Local Area Network) and the like is moving forward. The IEEE (Institute of Electrical and Electronics Engineers) 802.11 standard series is known as a major wireless LAN communication standard. The IEEE 802.11 standard series includes standards such as IEEE 802.11a/b/g/n/ac/ax and the like. For example, IEEE 802.11ax uses OFDMA (Orthogonal Frequency Division Multiple Access) to standardize techniques for improving communication speeds under congested conditions in addition to providing high peak throughput of up to 9.6 gigabits per second (Gbps) (PTL 1).

Recently, a task group called IEEE 802.11be was launched as a successor standard to further improve throughput, frequency utilization efficiency, and communication latency. In IEEE 802.11be, multi-link communication is being investigated, where a single AP (access point) establishes multiple links with a single STA (station) using a frequency band such as a 2.4 GHz band to communicate simultaneously. Additionally, due to hardware constraints in wireless communication devices, investigations are being made into configuring APs, STAs, and the like that while, in multi-link communication, transmission operations are underway through a given link, reception operations cannot be performed through other links.

CITATION LIST

Patent Literature

PTL 1: Japanese Patent Laid-Open No. 2018-50133

An STA which cannot perform reception operations through another link while transmission operations are underway through a given link needs to receive beacon frames (also called "beacons" hereinafter) periodically through each link. However, such an STA cannot receive a group addressed frame including a beacon through the other link while transmitting some kind of data through the given link. In addition, even if such an STA knows the timing for receiving a beacon through the given link, the timing at which to receive the beacon may shift depending on the degree of congestion in the link. Even in such a case, the STA needs to operate such that while transmission operations are underway through the given link, transmission operations cannot be performed through the other links.

SUMMARY OF THE INVENTION

Having been conceived in light of the problems described above, the present invention provides a technique for transmission/reception control in a case where a shift in the reception timing of a frame transmitted periodically in multi-link communication has occurred.

A communication apparatus according to one aspect of the present invention is a communication apparatus, compliant with an IEEE 802.11 series standard, that is capable of performing multi-link communication with an other communication apparatus using a plurality of links having different frequency channels, the communication apparatus comprising: a reception unit configured to receive a first frame from the other communication apparatus through a first link among the plurality of links; an obtainment unit configure to obtain, based on the first frame, information on a reception timing, of a predetermined interval, in the communication apparatus for the first frame transmitted from the other communication apparatus; and a transmission unit configured to transmit a second frame through a second link among the plurality of links, wherein the transmission unit does not transmit the second frame in a period including the reception timing, and transmits the second frame through the second link in response to the first frame being received by the reception unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIGS. 4A and 4B are flowcharts illustrating processing executed by an STA according to a first working example.

FIGS. 7A and 7B are flowcharts illustrating processing executed by the STA according to a second working example.

FIG. 8 is a sequence chart illustrating an example of processing performed by the AP and the STA according to the second working example.

FIG. 9 is a sequence chart illustrating another example of processing performed by the AP and the STA according to the second working example.

FIG. 12 is a sequence chart illustrating another example of processing performed by the AP and the STA according to the third working example.

FIG. 13 is a diagram illustrating an example of the configuration of a TIM element.

DESCRIPTION OF THE EMBODIMENTS

Figure 1:
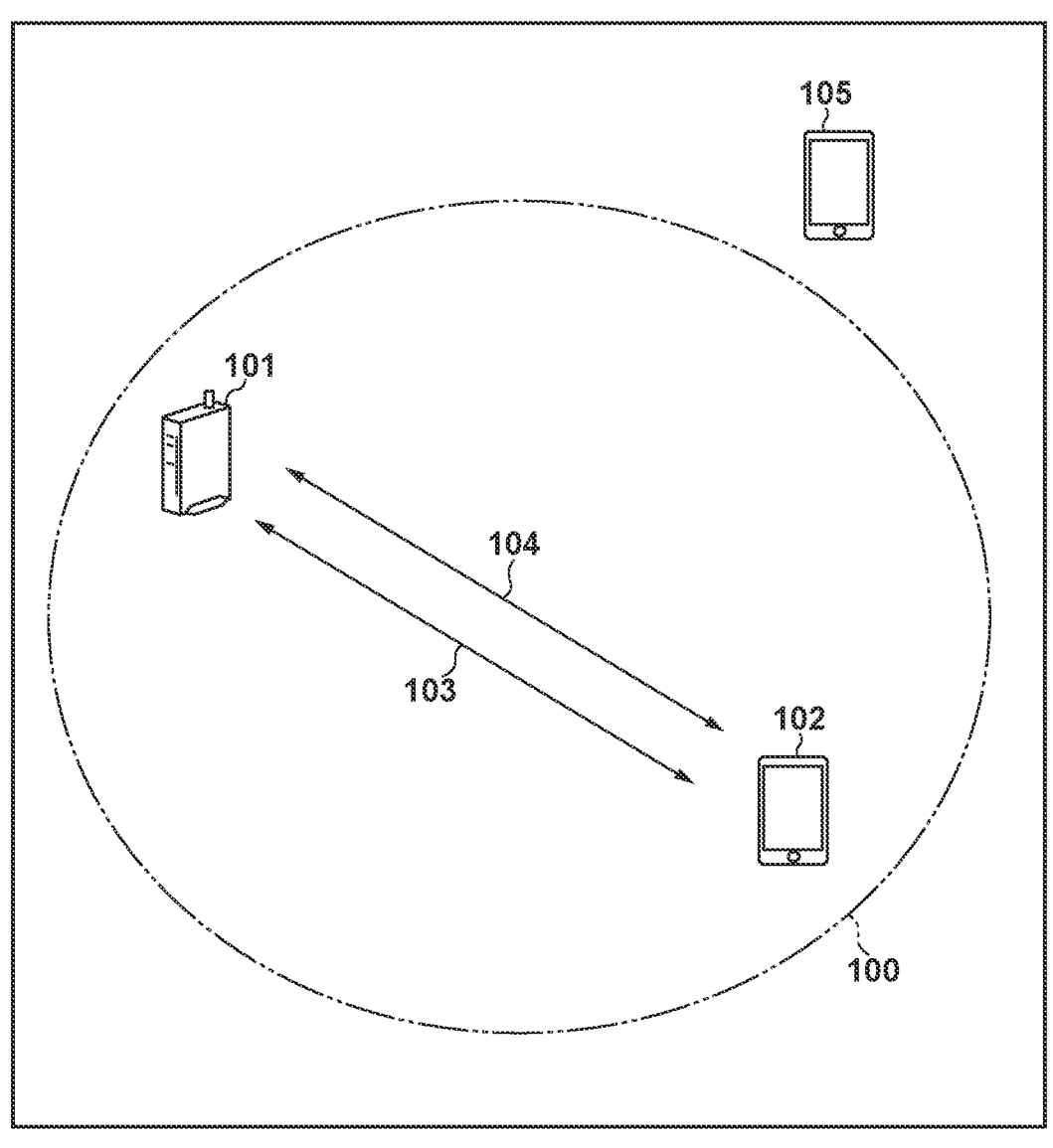
FIG. 1 is a diagram illustrating an example of the configuration of a wireless communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Configuration of Wireless Communication System

FIG. 1 illustrates an example of the configuration of a wireless communication system according to the present embodiment. The system is configured including communication apparatuses 101, 102, and 105. The communication apparatus 102 ("STA 102" hereinafter) is an STA (station/terminal apparatus) that has the role of joining a wireless network 100. The communication apparatus 101 ("AP 101" hereinafter) is an AP (access point) that has the role of constructing the wireless network 100. The AP 101 is capable of communicating with the STA 102. The communication apparatus 105 ("STA 105" hereinafter) is an STA that does not join the wireless network 100. The STA 105 is assumed to be at a distance where the STA 105 cannot communicate with the AP 101, but where the radio waves of each interfere with each other.

The AP 101 and the STA 102 can each execute wireless communication compliant with the IEEE 802.11be (EHT (Extreme/Extremely High Throughput)) standard. The AP 101 and the STA 102 can communicate at frequencies such as the 2.4 Hz band, the 5 GHz band, the 6 GHz band, the 60 GHz band, and the like. The frequency bands used by each communication apparatus are not limited thereto, and different frequency bands may be used, such as the 60 GHz band, for example. In addition, the AP 101 and the STA 102 can communicate using bandwidths of 20 MHz, 40 MHz, 80 MHz, 160 MHz, and 320 MHz. The bandwidths used by each communication apparatus are not limited thereto, and different bandwidths may be used, such as 240 MHz or 4 MHz.

By executing OFDMA communication compliant with the IEEE 802.11be standard, the AP 101 can implement multi-user (MU) communication that multiplexes signals from multiple users. In OFDMA communication, parts of a divided frequency band (Resource Units (RUs)) are allocated such that the STAs do not overlap with each other, and thus the carrier waves for the STAs are orthogonal to each other. Accordingly, the AP can communicate with multiple STAs in parallel within a defined bandwidth.

Although the AP 101 and the STA 102 are assumed to be compliant with the IEEE 802.11be standard, it should be noted that the AP 101 and the STA 102 may be also compliant with legacy standards prior to the IEEE 802.11be standard. Specifically, the AP 101 and the STA 102 may be compliant with at least one of the IEEE 802.11a/b/g/n/ac/ax standards. In addition to the IEEE 802.11 series standards, they may be compliant with other communication standards such as Bluetooth (registered trademark), NFC (Near Field Communication), UWB (Ultra Wide Band), ZigBee, MBOA (Multi Band OFMA Alliance), and the like. UWB includes wireless USB, wireless 1394, WiNET, and the like. They may also be compliant with a communication standard for wired communication, such as wired LAN.

A wireless LAN router, a personal computer (PC), or the like can be given as a specific example of the AP 101, but the AP 101 is not limited thereto. The AP 101 may be an information processing apparatus such as a wireless chip capable of executing wireless communication compliant with the IEEE 802.11be standard. A camera, a tablet, a smartphone, a PC, a mobile phone, a video camera, a headset, or the like can be given as a specific example of the STA 102, but the STA 102 is not limited thereto. The STA 102 may be an information processing apparatus such as a wireless chip capable of executing wireless communication compliant with the IEEE 802.11be standard.

The AP 101 and the STA 102 execute multi-link communication, in which links are established to perform communication over multiple frequency channels. The IEEE 802.11 series standard defines the bandwidth of each frequency channel as 20 MHz. Here, "frequency channel" refers to a frequency channel defined in the IEEE 802.11 series standard, and in this standard, multiple frequency channels are defined in each of the 2.4 GHz, 5 GHz, 6 GHz, and 60 GHz frequency bands. By bonding to an adjacent frequency channel, a bandwidth of 40 MHz or more may be used in a single frequency channel.

For example, the AP 101 can establish a link 103 with the STA 102 through a first frequency channel in the 2.4 GHz band and communicate with the STA 102. In parallel with this, the STA 102 can establish a link 104 with the AP 101 through a second frequency channel in the 5 GHz band and communicate with the AP 101. In this case, the STA 102 executes multi-link communication to maintain the link 104 in parallel with the link 103. By establishing multiple links (multi-link) with the STA 102 using multiple frequency channels in this manner, the AP 101 can improve the throughput of the communication with the STA 102.

Note that multiple links in different frequency bands may be established in multi-link communication. For example, the AP 101 and the STA 102 may establish another link in the 5 GHz band in addition to the link 103 in the 2.4 GHz band and the link 104 in the 6 GHz band. Alternatively, links may be established over multiple different channels included in the same frequency band. For example, the AP 101 and the STA 102 may establish a link on channel 6 in the 2.4 GHz band as the link 103, and a link on channel 1 in the 2.4 GHz band as the link 104.

The links in the same frequency band and links in different frequency bands may be intermixed as well. For example, the AP 101 and the STA 102 may establish the link 104 on channel 1 in the 2.4 GHz band and another link on channel 149 in the 5 GHz band in addition to the link 103 on channel 6 in the 2.4 GHz band. By establishing multiple connections with the STA 102 on different frequencies, even if a given band is congested, the AP 101 can establish communication with the STA 102 in another band, which prevents a drop in the throughput in the communication with the STA 102, communication latency, and the like.

The present embodiment assumes, as an example, that the link 103 is a 20 MHz connection on channel 6 in the 2.4 GHz band, and is link number 1. Additionally, the link 104 is assumed to be a 320 MHz connection on channel 113 in the 6 GHz band, and is link number 2.

Although the wireless network 100 illustrated in FIG. 1 is constituted by one AP and one STA, the number and arrangement of the AP and the STA are not limited thereto. For example, an additional STA may be provided in the wireless network illustrated in FIG. 1. At this time, the frequency band, the number, and the frequency range of each link to be established may be set as desired.

In the present embodiment, the STA 105 may be any communication apparatus that operates on one link, among the multiple links established between the AP 101 and the STA 102, without consideration for the other links. For example, although the foregoing described the STA 105 as an STA that does not join the wireless network 100, the STA 105 may join the wireless network 100. In this case, the STA 105 may be an STA that is not compliant with IEEE 802.11be, but is compliant with IEEE 802.11b, for example. In this case, the STA 105 and the AP 101 may establish a link on channel 6 in the 2.4 GHz band. Alternatively, the STA 105 may be a noise source that produces radio wave noise unrelated to the wireless network, such as a microwave oven. Alternatively, the STA 105 may be a communication apparatus that supports multi-link communication and that establishes multiple links with the AP 101. In this case, the STA 105 can be a communication apparatus that ignores operations through one link and communicates through another link.

In a case of performing multi-link communication, one instance of data may be divided, and transmitted to a partner apparatus over multiple links, between the AP 101 and the STA 102. The AP 101 and the STA 102 may be configured to execute MIMO (Multiple-Input and Multiple-Output) communication. In this case, the AP 101 and the STA 102 each has multiple antennas, and one of the apparatuses transmits different signals from respective antennas using the same frequency channel. The receiving side simultaneously receives all the signals arriving from multiple streams using the multiple antennas, and separates and decodes the signals of each stream. In this manner, executing MIMO communication enables the AP 101 and the STA 102 to communicate more data in the same amount of time than in a case of not executing MIMO communication. The AP 101 and the STA 102 may also execute MIMO communication on some links in a case of performing multi-link communication.

STA and AP Configurations

Figure 2:
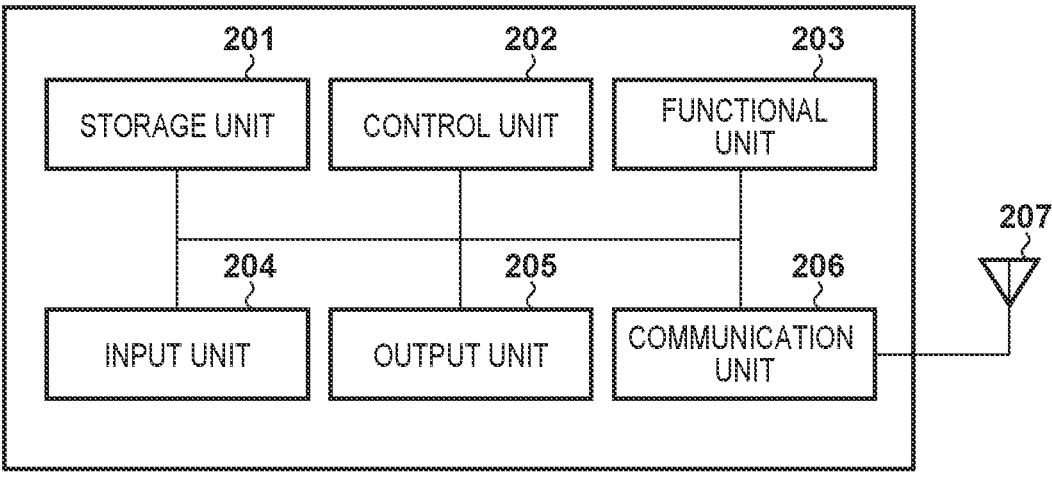
FIG. 2 is a diagram illustrating an example of the hardware configuration of a communication apparatus.

FIG. 2 illustrates an example of the hardware configuration of the STA 102 according to the present embodiment. The STA 102 includes the following as an example of the hardware configuration: a storage unit 201; a control unit 202; a functional unit 203; an input unit 204; an output unit 205; a communication unit 206; and an antenna 207. Note that the AP 101 can also have a hardware configuration similar to that of the STA 102.

The storage unit 201 is constituted by at least one memory such as a ROM (Read Only Memory) or a RAM (Random Access Memory), and stores various information such as computer programs for performing various operations (described later), communication parameters for wireless communication, and the like. Note that in addition to memory such as a ROM, a RAM, and the like, storage media such as flexible disks, hard disks, optical disks, magneto-optical disks, CD-ROMs, CD-Rs, magnetic tape, non-volatile memory cards, DVDs, and the like may be used as the storage unit 201. The storage unit 201 may include multiple memories and the like.

The control unit 202 is constituted by, for example, one or more processors such as a CPU (Central Processing Unit), an MPU (Micro Processing Unit), or the like, and controls the STA 102 as a whole by executing computer programs stored in the storage unit 201. Note that the control unit 202 may control the STA 102 as a whole by operating in cooperation with computer programs and an OS (Operating System) stored in the storage unit 201. The control unit 202 generates data or signals (wireless frames) to be transmitted in communication with other communication apparatuses. The control unit 202 may include multiple processors, e.g., may be multi-core, and may control the STA 102 as a whole using the multiple processors.

The control unit 202 also executes predetermined processing such as wireless communication, capturing images, printing, projection, and the like by controlling the functional unit 203. The functional unit 203 is hardware for the STA 102 to execute predetermined functions.

The input unit 204 accepts various operations from the user. The output unit 205 makes various outputs to the user through a monitor screen, a speaker, or the like. Here, the "outputs" from the output unit 205 may be displays made on the monitor screen, audio output through the speaker, vibration output, or the like. Note that both the input unit 204 and the output unit 205 may be implemented as a single module, as in the case of a touch panel. The input unit 204 and the output unit 205 may be integrated parts of the STA 102, or may be separate from the STA 102.

The communication unit 206 controls wireless communication compliant with the IEEE 802.11be standard. Note that in addition to the IEEE 802.11be standard, the communication unit 206 may control wireless communication compliant with other IEEE 802.11 series standards, as well as wired communication over a wired LAN or the like. The communication unit 206 controls the antenna 207 to transmit and receive signals for wireless communication generated by the control unit 202.

Note that if the STA 102 supports an NFC standard, a Bluetooth standard, or the like in addition to the IEEE 802.11be standard, wireless communication compliant with those communication standards may be controlled. If the STA 102 is capable of executing wireless communication compliant with multiple communication standards, the configuration may be such that separate communication units 206 and antennas 207 are provided for corresponding communication standards. The STA 102 communicates data such as image data, document data, video data, and the like through the communication unit 206. The antenna 207 may be configured as a unit separate from the communication unit 206, or may be configured as a single module together with the communication unit 206.

The antenna 207 is an antenna capable of communication in frequency bands such as the 2.4 GHz, 5 GHz, and 6 GHz bands. Although one antenna 207 is illustrated in FIG. 2, a plurality of antennas may be used. Alternatively, the STA 102 may have a different antenna for each frequency band. Additionally, as described above, in a case where a plurality of antennas are provided, the STA 102 may include a communication unit 206 corresponding to each of the antennas.

Figure 3:
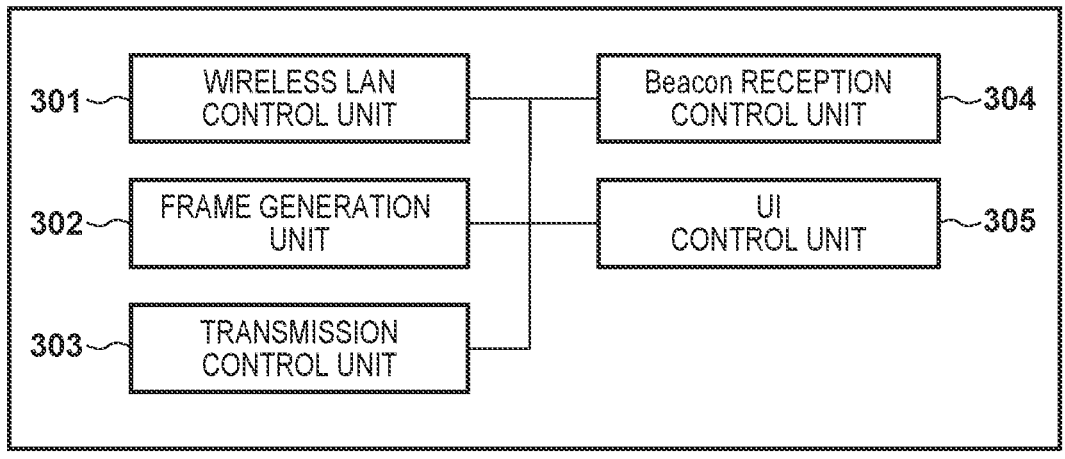
FIG. 3 is a diagram illustrating an example of the functional configuration of the communication apparatus.

FIG. 3 illustrates an example of the functional configuration of the STA 102 according to the present embodiment. The STA 102 includes the following as an example of the functional configuration: a wireless LAN control unit 301; a frame generation unit 302; a transmission control unit 303; a beacon reception control unit 304; and a UI (user interface) control unit 305. Note that the AP 101 can have a functional configuration similar to that of the STA 102.

The wireless LAN control unit 301 is configured including a program that performs control for transmitting and receiving wireless signals to and from other wireless LAN apparatuses. The wireless LAN control unit 301 transmits and receives frames generated by the frame generation unit 302 through the communication unit 206 and the antenna 207, and executes wireless LAN communication control, in accordance with the IEEE 802.11 standard series. Note that the number of wireless LAN control units is not limited to one, and may be two, or three or more.

The frame generation unit 302 generates wireless frames to be transmitted by the wireless LAN control unit 301. The content of the frames generated by the frame generation unit 302 may be constrained by settings stored in the storage unit 201 (FIG. 2). This may be changed according to user settings from the UI control unit 305. Information of the generated frames is sent to the wireless LAN control unit 301, and is transmitted to the communication partner through the communication unit 206 and the antenna 207.

The transmission control unit 303 performs transmission control on the various frames transmitted from the STA 102. For example, the transmission control unit 303 measures (counts) and determines the timing at which the frames should be transmitted through each link, and communicates the results thereof to the wireless LAN control unit 301. The wireless LAN control unit 301 transmits the frames based thereon.

The beacon reception control unit 304 manages the timing at which beacon frames (sometimes called "beacons" hereinafter) are received, analyzes the received beacons, and the like. For example, the beacon reception control unit 304 obtains, based on information on the received beacon, information on the timing at which the beacon will be received next, and communicates that information to the wireless LAN control unit 301, the transmission control unit 303, and the like. The timing at which the beacon is received (a beacon reception timing) can be obtained from a value indicating the interval between beacon transmissions, namely the TBTT (Target Beacon Transmission Time), included in the beacon.

The UI control unit 305 generates control signals based on operations made by the user in the input unit 204 (user settings), and communicates those signals to the various constituent elements. Meanwhile, the UI control unit 305 controls the various outputs made by the output unit 205.

The following working examples assume a scenario in which the STA 102 receives a group addressed frame in the communication system illustrated in FIG. 1. Note that the group addressed frame can be a frame including an address in which the Group Bit is 1 in the Destination Address (DA) field or the MAC Address field included in the A1 field. For example, a broadcast frame including a beacon is a type of group addressed frame because the Group Bit is 1. In addition, a multicast frame having a multicast address as the destination also has the Group Bit set to 1, and is therefore a group addressed frame.

Next, processing by the STA 102 according to the present embodiment will be described with reference to several working examples. Note that in the present embodiment, the AP 101 periodically transmits a beacon including a TIM (Traffic Indication Message). The STA 102 can obtain the information on the beacon reception timing at a predetermined interval from the value indicating the interval at which beacons are transmitted, included in the beacon. If data for the STA 102 is present, the AP 101 can use a beacon to make a notification that such data is present (a group addressed frame) using the TIM (TIM element), and can then transmit the data after making the notification. The TIM, which enables the notification that the data is present, is called a DTIM (Delivery Traffic Indication Message).

First Working Example

The present working example assumes a scenario in which when the STA 102 receives the beacon through the link 104, the beacon cannot be received at the expected timing. At this time, in the present working example, the STA 102 is configured not to transmit frames through the link 103 and the link 104 until the beacon and a subsequent group addressed frame (aside from the beacon) are received.

Note that in the present working example, the beacon may be any frame as long as it is a group addressed frame. For example, the beacon may be a multicast frame having a multicast address as the destination. A FILS Discovery frame or an Unsolicited Probe Response frame may be sent between beacons at 20 TU (Time Unit) intervals. This frame may be another management frame such as a Probe Response frame, an Action frame, or the like. Alternatively, a trigger frame may be transmitted periodically. Additionally, although the present working example considers a scenario where the beacon is received through the link 103 only, the same applies to a scenario where the beacon is received through the link 104 only. The same also applies to a scenario where the beacon is received simultaneously through the link 103 and the link 104. The same also applies to a scenario where the link 103 and the link 104 receive the beacon simultaneously, but one of the links could not receive the beacon.

Figure 4A:
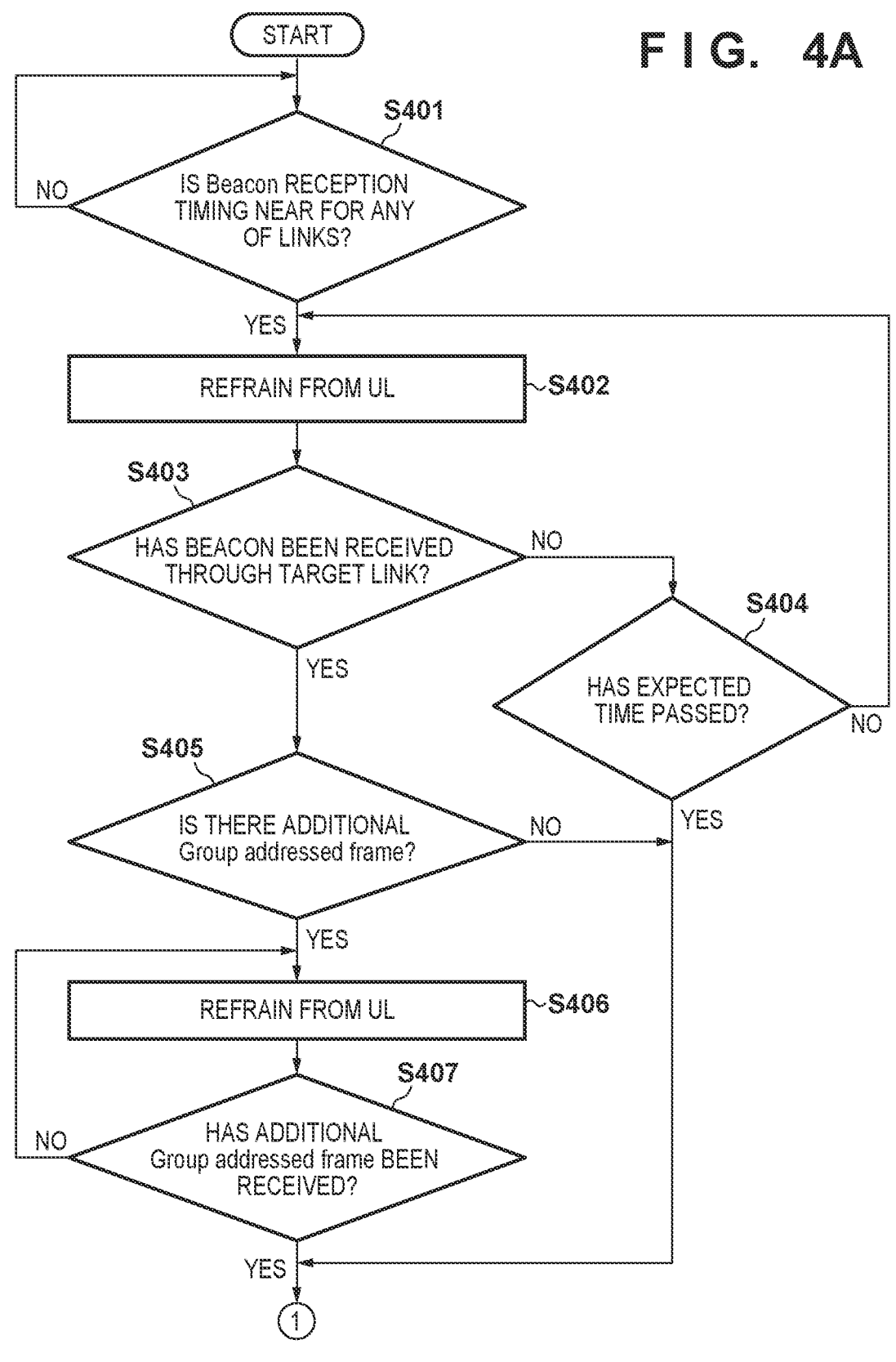

FIGS. 4A and 4B are flowcharts illustrating processing performed by the STA 102 when the STA 102 receives a beacon from the AP 101 through the link 104 in the present working example. The flowchart in FIGS. 4A and 4B can be realized by the control unit 202 of the STA 102 executing a control program stored in the storage unit 201, and computing and processing information as well as controlling each piece of hardware. The processing illustrated in these flowcharts can be started upon the STA 102 establishing a multi-link connection with the AP 101 (through the link 103 and the link 104, in the present embodiment).

With the STA 102 connected to the AP 101, the beacon reception control unit 304 of the STA 102 determines whether the beacon reception timing is near for any of the links, or in other words, whether the current time is a predetermined time before the beacon reception timing (S401). Although the predetermined time is assumed to be 10 μsec in the present working example, this is one example, and the predetermined time may be 5 μsec or 20 μsec. Note also that as described above, whether the beacon reception timings are the same can be determined by a value, included in the beacon received from the AP 101, that indicates the interval of the times at which beacons are transmitted. In the present working example, the beacon reception timing is assumed to be every 100 msec (i.e., the beacon interval=100 msec), but can be set to any interval, such as every 150 msec.

In a case where the beacon reception timing is near for any of the links (Yes in S401), the processing moves to S402. A link for which the beacon reception timing is near will be called a "target link" hereinafter. In S402, under the control of the transmission control unit 303 of the STA 102, the wireless LAN control unit 301 causes the STA 102 to refrain from uploading (UL) data before the target link enters a period for beacon reception. In other words, the STA 102 does not upload or transmit data in a period that includes the beacon reception timing. This means that if data is being uploaded, the data uploads are suspended for all links. Here, the links for which uploading is suspended are all links constituting a combination of links through which transmission and reception cannot be performed simultaneously. Accordingly, in a case where, for example, a third link (not shown) through which the AP 101 and the STA 102 can transmit and receive simultaneously has been established, the data uploading need not be suspended on the third link.

Next, the beacon reception control unit 304 of the STA 102 waits for the beacon to be received through the target link (S403). In a case where a beacon has not been received through the target link at the beacon reception timing (No in S403), the transmission control unit 303 of the STA 102 confirms whether a predetermined expected time (a time corresponding to the timing for stopping to stand by for frame reception after the original beacon reception timing) has passed (S404). The present embodiment assumes that the expected time is 10 msec. If the expected time has not passed (No in S404), the processing returns to S402, whereas if the expected time has passed (Yes in S404), the processing moves to S408. In a case where the beacon has been received through the target link (Yes in S403), the beacon reception control unit 304 of the STA 102 confirms whether there is an additional group addressed frame (whether a group addressed frame is transmitted following the beacon) (S405). To that end, the STA 102 confirms the TIM element included in the beacon. The STA 102 can also confirm whether data addressed to the STA 102 itself has accumulated by confirming the TIM element.

FIG. 13 illustrates an example of the configuration of a TIM element 1300. This element is defined according to the IEEE 802.11 standard. An Element ID field 1301 holds a value of 5, indicating that the element to be used is a TIM element. A length field 1302 indicates the length of the element. A DTIM Count field 1303 indicates whether the beacon including the element is a DTIM (Delivery Traffic Indication Map) beacon (a beacon including a DTIM). This value being 0 indicates that the beacon including the element is a DTIM Beacon, and it is possible that a frame (data) for the STA is included thereafter. If the value is a value aside from 0, the beacon is not a DTIM beacon, and thus the STA 102 can determine that there are no frames for the STA or group addressed frames following the beacon.

A Bitmap Control field 1305 indicates whether Bit0 thereof has an AID0 (Association Identifier) frame. Bit0 being 1 indicates that some additional group addressed frame is prepared after the beacon. A Partial Virtual Bitmap field 1306 indicates whether frames for each STA are accumulated in a queue. Each bit prepared in this field is associated with an AID allocated to the STA from the AP when the connection is made. By confirming whether the bit associated with the AID is set to 1, the STA 102 can determine whether frames addressed to the STA 102 itself have accumulated in the data transmission queue of the AP.

The beacon reception control unit 304 of the STA 102 confirms the TIM element included in the beacon, and in a case where a group addressed frame is confirmed to be transmitted following the beacon (Yes in S405), the processing moves to S406, whereas in a case where it is not confirmed (No in S405), the processing moves to S408. In S406, the wireless LAN control unit 301 continues to refrain from uploading data (continues the suspension) under the control of the transmission control unit 303 of the STA 102. The transmission control unit 303 of the STA 102 refrains from uploading data until the additional group addressed frame is fully received (S407). The determination as to whether the additional group addressed frame has been fully received may be made based on a set period of time that has passed since the STA 102 received the group addressed frame through the target link (the link through which the group addressed frame was received), e.g., a DIFS (Distributed Coordination Function Interframe Space) time. Alternatively, an Ack frame or a Block Ack frame being transmitted after the group addressed frame has been received may be used as a trigger.

In a case where the wireless LAN control unit 301 of the STA 102 has received a group addressed frame following a beacon through the target link (Yes in S407), or the group addressed frame could not be received before the set period of time has passed (Yes in S404), the processing moves to S408. In S408, the transmission control unit 303 of the STA 102 confirms whether transmission frames have accumulated in the transmission queue of the STA 102 itself (S408). In a case where it is confirmed that there is no transmission data accumulated in the transmission queue (No in S408), the transmission control unit 303 of the STA 102 ends the processing. In a case where it is confirmed that there is transmission data accumulated in the transmission queue (Yes in S408), the processing moves to S409. In S409, the transmission control unit 303 of the STA 102 sets a back-off counter for a standby time until further communication is started after waiting for the period of an AIFS (Arbitration Interframe Space) after the reception of the last frame. Note that the value of the AIFS differs depending on the priority level of the data to be transmitted. The AIFS is short for voice (VO) and video (VI) data, which have a high priority level. Conversely, the AIFS is set to be long for background (BK) data, which has a low priority level. Note that the waiting period here may be a DIFS. Also, the counter value of the back-off counter can be set to any desired value.

Once the back-off counter is set, the transmission control unit 303 of the STA 102 confirms whether another communication apparatus is transmitting a frame on any of the links which cannot transmit and receive simultaneously (S410). In a case where it is confirmed that no other communication apparatus is transmitting a frame for all of the links (No in S410), the transmission control unit 303 of the STA 102 reduces the back-off counter by 1 (S416). The transmission control unit 303 of the STA 102 repeats this until the back-off counter reaches 0 (S417). Once the back-off counter has reached 0 (Yes in S417), the wireless LAN control unit 301 of the STA 102 starts (resumes) data transmission (S418).

In a case where it is confirmed that another communication apparatus is transmitting a frame on any of all of the links (Yes S410), the transmission control unit 303 of the STA 102 confirms whether the link through which the other communication apparatus is transmitting is a link through which the STA 102 is expected to transmit a frame (S411). In a case where the link through which the other communication apparatus is transmitting is a link through which a frame is expected to be transmitted (Yes in S411), the transmission control unit 303 of the STA 102 stands by for transmission for a NAV (Network Allocation Vector) period included in the frame. Then, after the end of the NAV period, the transmission control unit 303 of the STA 102 waits again for the AIFS period (S414). The waiting period here may be the DIFS period. In a case where the STA 102 has confirmed a further frame transmission by another communication apparatus during this, the STA 102 waits again in the same manner. Once the AIFS period ends, the transmission control unit 303 of the STA 102 resumes the processing of the back-off counter (S415), and the processing returns to S410 again.

In a case where, in S411, the link through which the other communication apparatus is transmitting is not a link through which a frame is expected to be transmitted (No in S411), the transmission control unit 303 of the STA 102 confirms whether the frame transmitted by the other communication apparatus is addressed to the STA 102 (to itself) (S412). In a case where the transmitted frame is addressed to the STA 102 (Yes in S412), it is necessary for the STA 102 to receive that frame, and frames cannot be transmitted on other links which the frame is being received. Accordingly, it is necessary for the STA 102 to wait to until the frame reception is complete before transmitting a frame on all links in combinations in which frames cannot be transmitted and received simultaneously (S413). Once the frame reception is complete, the processing returns to S410 again.

Note that the transmission control unit 303 of the STA 102 may continue the processing of the back-off counter for the link through which transmission is expected while waiting in S413. In this case, although continuing the counter processing, the STA 102 waits to transmit the frame until the frame reception through the other link is complete, even if the counter reaches 0. Then, when the frame reception through the other link is complete, the wireless LAN control unit 301 of the STA 102 transmits the frame if no other communication apparatus is transmitting a frame through the link where a frame is expected to be transmitted (the link waiting for transmission). However, since a frame is transmitted at the same time that frame reception is completed on the other link, there is a high likelihood of radio wave collisions with other communication apparatuses on the link through which the frame is transmitted. Accordingly, in a case where there is a frame addressed to the STA 102 itself even on another link, it is desirable to temporarily stop the back-off counter for all links, among the combinations for which transmission and reception cannot be performed simultaneously, that are standing by for transmission. In a case where no frames are being received by the STA 102 through another link (No in S412), the transmission control unit 303 of the STA 102 increments the back-off counter (S416). The processing from S417 on is as described above.

Note that although FIGS. 4A and 4B assume that there is one link through which the STA 102 is expected to transmit frames, in a case where the STA 102 is attempting to transmit frames through multiple links simultaneously, the processing may be performed separately on a link-by-link basis. For example, in a case where, when preparing to transmit through the link 103 and the link 104, the STA 102 confirms that another communication apparatus is transmitting frames through the link 104, the processing for the link 103 may move to S412, and the processing for the link 104 may move to S414.

Figure 5:
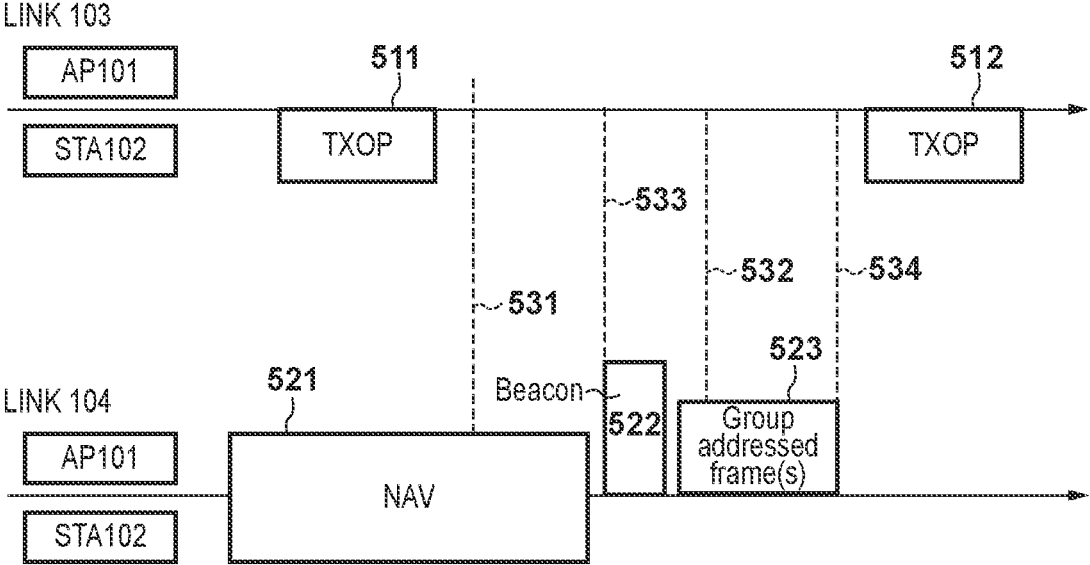
FIG. 5 is a sequence chart illustrating an example of processing performed by an AP and the STA according to the first working example.

The flow of a series of processing performed by the AP 101 and the STA 102 according to the present working example will be described next with reference to FIGS. 5 and 6. FIG. 5 is a sequence chart illustrating an example of the processing performed by the AP 101 and the STA 102 in the present working example, and the following descriptions will also refer to FIGS. 4A and 4B. FIG. 5 illustrates a case where an additional group addressed frame is received following the beacon on one link in a multi-link (the link 103 and the link 104), but the beacon reception timing has shifted due to channel congestion. The link 103 and the link 104 are links that are a combination of links that cannot transmit and receive simultaneously.

The STA 102 is transmitting (uploading) data through the link 103 according to its own TXOP (Transmission Opportunity; time for which continuous transmission is possible)

511. On the other hand, on the link 104, for example, the STA 105 (see FIG. 1) is transmitting a data frame to an AP aside from the AP 101, and a NAV period 521 is set. The STA 102 is expected to receive a beacon through the link 104 at an original beacon reception timing 531. When the beacon reception timing 531 approaches (Yes in S401), the STA 102 refrains from (temporarily suspends) uploading data (S402).

Note that if the length of the NAV period 521 on the link 104 is known and the NAV period 521 is known to not overlap with the beacon reception timing on the link 103, the STA 102 may continue to transmit data (the TXOP 511) until the NAV period 521 ends. In FIG. 5, the STA 102 may continue transmitting data up to a beacon reception timing 533 following the end of the NAV period 521. However, in a case where there is a major difference between the end of the NAV period 521 and the beacon reception timing, the STA 102 may consider transmitting data based on the end of the NAV period 521. In a case where the end of the NAV period 521 is earlier than the beacon reception timing, the STA 102 suspends the data transmission before the beacon reception timing.

The present working example considers a case where setting the NAV period 521 is valid for the STA 102 but invalid for the AP 101, depending on the radio environment. As such, in the present working example, the STA 102 uses the beacon reception timing 531 as a guide to suspend the data transmission, regardless of the NAV period. This enables the STA 102 to receive a beacon through the link 104 even if the period in which a beacon can be received from the AP 101 overlaps with the NAV period considered by the STA 102.

A timing 532 indicates the timing at which to stop standing by for frame reception (corresponding to the expected time in S404) in a case where a beacon has not been received at the original beacon reception timing 531 (No in S403). In FIG. 5, the STA 102 receives a beacon 522 from the AP 101 through the link 104 at a timing 533 at which the NAV period 521 ends, before the timing 532. The STA 102 confirms the TIM element included in the beacon 522 (see the TIM element 1300 in FIG. 13), and confirms that a group addressed frame is transmitted following the beacon (Yes in S405). Accordingly, after receiving the beacon 522, the STA 102 receives an additional group addressed frame 523 thereafter (S407).

Once the reception of the beacon and the additional group addressed frame have been received at a timing 534 (Yes in S407), the STA 102 resumes data transmission in accordance with a TXOP 512 (S408, S409, S410, S416, S417, S418). Note that the STA 102 may return an Ack frame through the link 104 after receiving the additional group addressed frame, and in that case, the data transmission will resume through the link 103 after the Ack frame.

Figure 6:
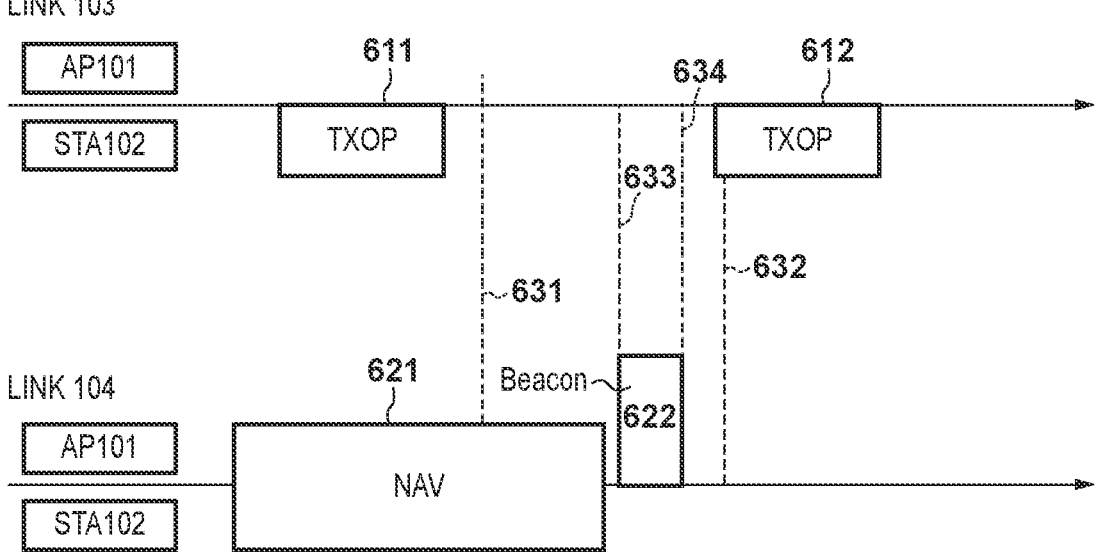
FIG. 6 is a sequence chart illustrating another example of processing performed by the AP and the STA according to the first working example.

FIG. 6 is a sequence chart illustrating another example of the processing performed by the AP 101 and the STA 102 in the present working example, and the following descriptions will also refer to FIGS. 4A and 4B. FIG. 6 illustrates a case where a beacon is received through a given link in a multi-link (the link 103 and the link 104), but the beacon reception timing has shifted due to channel congestion. In the example in FIG. 6, no additional group addressed frame is transmitted following the beacon. The link 103 and the link 104 are links that are a combination of links that cannot transmit and receive simultaneously.

As in FIG. 5, the STA 102 is transmitting (uploading) data through the link 103 according to its own TXOP 611. On the other hand, on the link 104, for example, the STA 105 (see FIG. 1) is transmitting a data frame to an AP aside from the AP 101, and a NAV period 621 is set. The STA 102 is expected to receive a beacon through the link 104 at an original beacon reception timing 631. When the beacon reception timing 631 approaches (Yes in S401), the STA 102 temporarily suspends uploading data (S402).

Note that in a case where the length of the NAV period 621 on the link 104 is known and the NAV period 621 is known to not overlap with the beacon reception timing on the link 103, the STA 102 may continue to transmit data (the TXOP 611) until the NAV period 621 ends. The details of this point are as described above.

A timing 632 indicates the timing at which to stop standing by for frame reception (where the timing 531 to the timing 632 correspond to the expected time in S404) in a case where a beacon has not been received at the original beacon reception timing 631 (No in S403). In FIG. 6, the STA 102 receives a beacon 622 from the AP 101 through the link 104 at a timing 633 at which the NAV period 621 ends, before the timing 632. The STA 102 confirms the TIM element included in the beacon 622 (see the TIM element 1300 in FIG. 13), and confirms that a group addressed frame is not transmitted following the beacon (No in S405). Accordingly, at a timing 634, the STA 102 completes the reception over the link 104. As such, the STA 102 then resumes data transmission according to a TXOP 612 (S408, S409, S410, S416, S417, S418). In the present working example, the timing 632 need not be determined.

As described with reference to FIGS. 4A to 6, according to the first working example, the STA 102 can continue to transmit data, without transmitting and receiving simultaneously, even if the timing at which a beacon is received from the AP 101 has shifted.

Note that in a case where the timing of the beacon transmission has shifted, the AP 101 is assumed to use the cycle from the original timing of the beacon transmission as the timing for the next beacon transmission. For example, consider a case where the beacon transmission interval (cycle) is 100 TUs, and the AP 101 first transmits a beacon at 0 TUs, and then transmits a beacon at 103 TUs. In this case, the AP 101 may set the timing of the next beacon transmission to be closer to the 200 TU point. This is merely an example, and the cycle of the beacon transmission may be set using another method. The AP 101 may also set the next beacon transmission to be closer to 203 TUs.

The AP 101 may also perform operations to align the beacon transmission timing between the link 103 and the link 104. As a result, in the STA 102, the beacon reception timing may overlap between the link 103 and the link 104. In this case, the STA 102 stands by for transmission until the beacon, and the group addressed frame following thereafter (if present), have been received through both the link 103 and the link 104. In a case where a beacon could not be received before the reception of the beacon and the group addressed frame is complete on both links, or before the timing for stopping to stand by for reception, the STA 102 resumes the transmission of frames. By aligning the timings at which the AP 101 transmits the beacon, the STA 102 can reduce the period of time to stand by for transmitting data frames. As a result, aligning the timing at which beacons are transmitted through multi-link by the AP 101, the throughput of the STA 102 can be improved.

The STA 102 may also receive an Ack frame, a Block Ack frame, or the like, which are reception confirmations, from the AP 101, after suspending the data transmission as illustrated in FIGS. 5 and 6 (the TXOPs 511 and 611). In a case of receiving these frames, the STA 102 may suspend transmission having estimated the time to receive these frames with a certain margin. This makes it possible to receive feedback on the transmitted data at the time of the suspension and to quickly retransmit data.

Second Working Example

The present working example will describe a case where the STA 102 does not attempt to receive a beacon through the target link if a beacon reception period has passed. The present working example assumes that the beacon is received through the link 104. However, the same applies to a scenario where a beacon is received through the link 103. The same also applies to a scenario where the beacon is received simultaneously through the link 103 and the link 104. The same also applies to a scenario in which both attempt to receive the beacon simultaneously, but one could not receive the beacon. Content already described in the foregoing working example will not be described in the present working example.

FIGS. 7A and 7B are flowcharts illustrating processing performed by the STA 102 when the STA 102 receives a beacon from the AP 101 through the link 104 in the present working example. The flowchart in FIGS. 7A and 7B can be realized by the control unit 202 of the STA 102 executing a control program stored in the storage unit 201, and computing and processing information as well as controlling each piece of hardware. The processing illustrated in these flowcharts can be started upon the STA 102 establishing a multi-link connection with the AP 101 (through the link 103 and the link 104, in the present embodiment).

With the STA 102 connected to the AP 101, the beacon reception control unit 304 of the STA 102 determines whether the beacon reception timing is near for any of the links, or in other words, whether the current time is a predetermined time before the beacon reception timing (S701). Although the predetermined time is assumed to be 10 μsec in the present working example, this is one example, and the predetermined time may be 5 μsec or 20 μsec. In the present working example, the beacon reception timing is assumed to be every 100 msec (i.e., the beacon interval=100 msec), but can be set to any interval, such as every 150 msec.

In a case where the beacon reception timing is near for any of the links (Yes in S701), the processing moves to S702. A link for which the beacon reception timing is near will be called a "target link" hereinafter. In S702, the transmission control unit 303 of the STA 102 causes the STA 102 to refrain from uploading (UL) data before the target link enters a period for beacon reception. In other words, the STA 102 does not upload or transmit data in a period that includes the beacon reception timing. This means that if data is being uploaded, the data uploads are suspended for all links. Here, the links for which uploading is suspended are all links constituting a combination of links through which transmission and reception cannot be performed simultaneously. Accordingly, in a case where, for example, a third link (not shown) through which the AP 101 and the STA 102 can transmit and receive simultaneously has been established, the data uploading need not be suspended on the third link.

Next, the beacon reception control unit 304 of the STA 102 waits for a set period to receive a beacon through the target link (S703). In other words, the STA 102 waits for a period from the original beacon reception timing to when the set period has passed (called a "first reception standby period" hereinafter). In the present working example, the first reception standby period is 100 μsec, but this is one example, and a different period may be used. At the point in time when the first reception standby period has passed (Yes in S703), the transmission control unit 303 of the STA 102 checks whether transmission data has accumulated in the transmission queue (S704). In a case where no transmission data has accumulated (No in S704), the STA 102 ends the processing. In a case where transmission data has accumulated (Yes in S704), the beacon reception control unit 304 of the STA 102 confirms whether a beacon was received during the first reception standby period (S705).

In a case where a beacon could not be received during the first reception standby period (No in S705), the wireless LAN control unit 301 of the STA 102 stops attempting to receive data through the target link (S709). In other words, the STA 102 gives up on receiving data. In a case where a beacon was received during the first reception standby period (Yes in S705), the process moves to S706, where the beacon reception control unit 304 confirms whether a group addressed frame is transmitted following the beacon. This confirmation processing is similar to S405 in FIG. 4A.

In a case where it is confirmed that a group addressed frame is transmitted following the beacon (Yes in S706), the processing moves to S707, and in a case where it is not confirmed, (No in S706), the processing moves to S710. In S707, the wireless LAN control unit 301 of the STA 102 confirms whether an additional group addressed frame following the beacon has been received. The wireless LAN control unit 301 waits for the additional group addressed frame to be received for a predetermined period after receiving the beacon (S708). In the present working example, this period (called a "second reception standby period" hereinafter) is 100 μsec, but this is one example, and a different period may be used. In a case where a group addressed frame could not be received even after the second reception standby period has passed (Yes in S708), the STA 102 stops attempting to receive data through the target link (S709), and the processing moves to S710. In a case where a group addressed frame was received during the second reception standby period (Yes in S707), the processing moves to S710. In S710, as in S409 of FIG. 4B, the transmission control unit 303 of the STA 102 sets the back-off counter for the link through which transmission is expected (S710). The processing of S711 to S719 is similar to the processing of S410 to S418 in FIG. 4B, and will therefore not be described.

Note that the confirmation as to whether a group addressed frame has been received in S707 may be the STA 102 confirming whether a frame addressed to itself is present. In a case where it is known that a group addressed frame has been received through a link aside from the target link (the link through which the beacon is expected to be received), e.g., the link 103, the STA 102 may determine that the group addressed frame following the beacon is not to be received, and the processing may move to S710.

The flow of a series of processing performed by the AP 101 and the STA 102 according to the present working example will be described next with reference to FIGS. 8 to 10. FIG. 8 is a sequence chart illustrating an example of the processing performed by the AP 101 and the STA 102 in the present working example, and the following descriptions will also refer to FIGS. 7A and 7B. FIG. 8 illustrates a case where a beacon is received through a given link in a multi-link (the link 103 and the link 104), but the beacon reception timing has shifted due to channel congestion. Furthermore, FIG. 8 illustrates a case where an addition group addressed frame was expected to be received following the beacon, but the frame could not be received within a predetermined period. The link 103 and the link 104 are links that are a combination of links that cannot transmit and receive simultaneously.

As in FIG. 5 described in the first working example, the STA 102 is transmitting (uploading) data through the link 103 according to its own TXOP 811. On the other hand, on the link 104, for example, the STA 105 (see FIG. 1) is transmitting a data frame to an AP aside from the AP 101, and a NAV period 821 is set. The STA 102 is expected to receive a beacon through the link 104 at an original beacon reception timing 831. When the beacon reception timing 831 approaches (Yes in S701), the STA 102 temporarily suspends uploading data (S702).

Note that in a case where the length of the NAV period 821 on the link 104 is known and the NAV period 821 is known to not overlap with the beacon reception timing on the link 103, the STA 102 may continue to transmit data (the TXOP 811) until the NAV period 821 ends. The details of this point are as described in the first working example.

Note that in a case where the length of the NAV period 821 on the link 104 is known and the NAV period 821 is known to not overlap with the period in which the beacon is received through the link 103, the STA 102 may continue to transmit data (the TXOP 811) until the NAV period 621 ends. The details of this point are as described above.

A timing 832 indicates the timing at which to stop waiting for the reception of the group addressed frame following the beacon, in a case where the beacon has been received (the period from a timing 833 to the timing 832 corresponds to the second reception standby period in S708 of FIG. 7A). In FIG. 8, the STA 102 receives a beacon 822 from the AP 101 through the link 104 at the timing 833 at which the NAV period 821 ends, before the timing 832. The AP 101 transmits an additional group addressed frame 823 following the beacon 822. However, the second reception standby period has passed between the transmission of the beacon 822 and the additional group addressed frame 823, and thus the STA 102 receives the beacon 822 through the link 104 but does not receive frames in a period 824 following the timing 832 (not received). Instead, the STA 102 resumes data transmission in accordance with a TXOP 812 through the link 103 (No in S707, Yes in S708, S709, S710, S711, S717, S718, and S719). The AP 101 completes the transmission of the additional group addressed frame 823 at a timing 834. However, the STA 102 ignores the reception of this group addressed frame, and transmits a data frame through the link 103.

FIG. 9 is a sequence chart illustrating another example of the processing performed by the AP 101 and the STA 102 in the present working example, and the following descriptions will also refer to FIGS. 7A and 7B. FIG. 9 illustrates a case where a beacon is received through a given link in a multi-link (the link 103 and the link 104), but the beacon reception timing has shifted due to channel congestion. In the example in FIG. 9, no additional group addressed frame is transmitted following the beacon. The link 103 and the link 104 are links that are a combination of links that cannot transmit and receive simultaneously.

As in FIG. 8, the STA 102 is transmitting (uploading) data through the link 103 according to its own TXOP 911. On the other hand, on the link 104, for example, the STA 105 (see FIG. 1) is transmitting a data frame to an AP aside from the AP 101, and a NAV period 921 is set. The STA 102 is expected to receive a beacon through the link 104 at an original beacon reception timing 931. When the beacon reception timing 931 approaches (Yes in S701), the STA 102 temporarily suspends uploading data (S702).

Note that in a case where the length of the NAV period 921 on the link 104 is known and the NAV period 921 is known to not overlap with the beacon reception timing on the link 103, the STA 102 may continue to transmit data (the TXOP 911) until the NAV period 921 ends. The details of this point are as described in the first working example.

A timing 932 indicates the timing at which to stop waiting for the reception of the beacon (the period from the original beacon reception timing 931 to the timing 932 corresponds to the first reception standby period in S703 of FIG. 7A). In FIG. 9, the STA 102 receives a beacon 922 from the AP 101 through the link 104 at a timing 933 before the timing 932. The beacon 922 is not followed by an additional group addressed frame, and thus the STA 102 completes the reception through the link 104 at a timing 934. Accordingly, the STA 102 then resumes data transmission in accordance with a TXOP 912 (No in S706, S710, S711, S717, S718, and S719).

Figure 10:
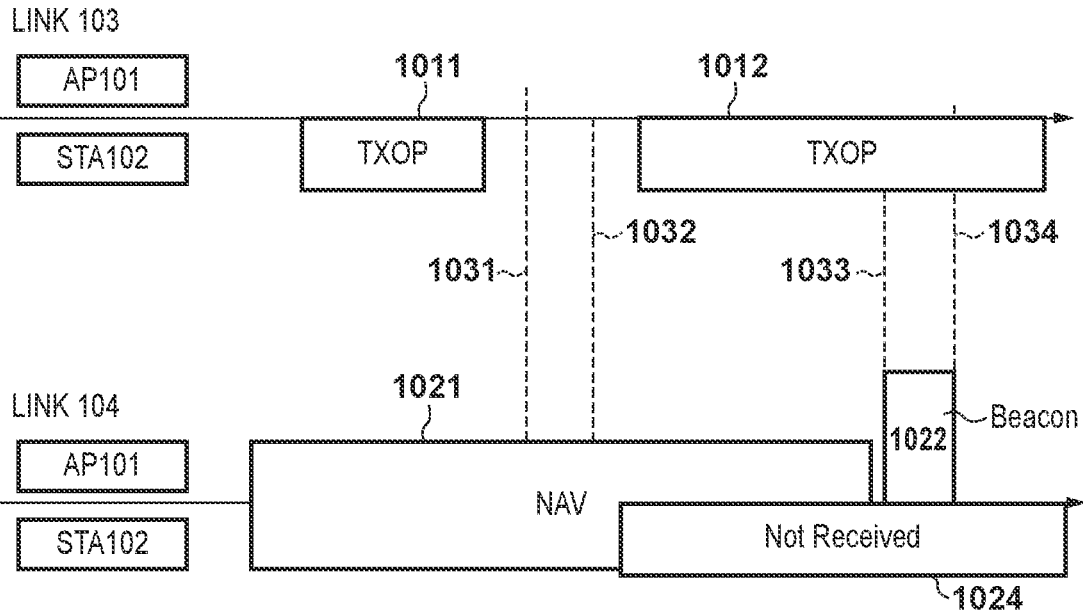
FIG. 10 is a sequence chart illustrating another example of processing performed by the AP and the STA according to the second working example.

FIG. 10 is a sequence chart illustrating another example of the processing performed by the AP 101 and the STA 102 in the present working example, and the following descriptions will also refer to FIGS. 7A and 7B. FIG. 10 illustrates a case where a beacon is received through a given link in a multi-link (the link 103 and the link 104), but the beacon reception timing has shifted due to channel congestion. Furthermore, FIG. 10 illustrates a case where a beacon was expected to be received, but the beacon could not be received within a predetermined period. The link 103 and the link 104 are links that are a combination of links that cannot transmit and receive simultaneously.

As in FIG. 8, the STA 102 is transmitting (uploading) data through the link 103 according to its own TXOP 1011. On the other hand, on the link 104, for example, the STA 105 (see FIG. 1) is transmitting a data frame to an AP aside from the AP 101, and a NAV period 1021 is set. The STA 102 is expected to receive a beacon through the link 104 at an original beacon reception timing 1031. When the beacon reception timing 1031 approaches (Yes in S701), the STA 102 temporarily suspends uploading data (S702).

Note that in a case where the length of the NAV period 1021 on the link 104 is known and the NAV period 1021 is known to not overlap with the beacon reception timing on the link 103, the STA 102 may continue to transmit data (the TXOP 1011) until the NAV period 1021 ends. The details of this point are as described in the first working example.

A timing 1032 indicates the timing at which to stop waiting for the reception of the beacon (the period from the original beacon reception timing 1031 to the timing 1032 corresponds to the first reception standby period in S703 of FIG. 7A). Regardless of whether the beacon has been received, the STA 102 resumes transmitting data in accordance with a TXOP 1012 in response to the timing 1032 having passed (the first reception standby period having passed) (No in S705, S709, S710, S711, S717, S718, and S719). In FIG. 10, a beacon 1022 is transmitted from the AP 101 at a timing 1033, which is later than the timing 1032. The end of the beacon transmission corresponds to a timing 1034. However, the STA 102 is transmitting data through the link 103, and thus the beacon 1022 cannot be received through the link 104 during a period 1024 corresponding to the TXOP (not received).

As described with reference to FIGS. 7A to 10, according to the second working example, even in a case where the timing at which the beacon is received from the AP 101 has shifted, the STA 102 prioritizes the transmission of data over receiving the beacon. This makes it possible for the STA 102 to communicate data frames to the AP 101 as soon as possible, even in a case where there are differences in congestion from link to link, and as a result, communication latency caused by the STA 102 can be reduced.

Third Working Example

The first working example and the second working example described cases where the AP 101 transmits the beacon and the STA 102 receives the beacon, but the frame transmitted may be any frame as long as it is a group addressed frame transmitted periodically. For example, a trigger frame set by TWT (Target Wake Time), a power-saving technology which is compliant with the IEEE 802.11 series standard, may be used. The present working example will describe operations using the TWT as an example.

Figure 11:
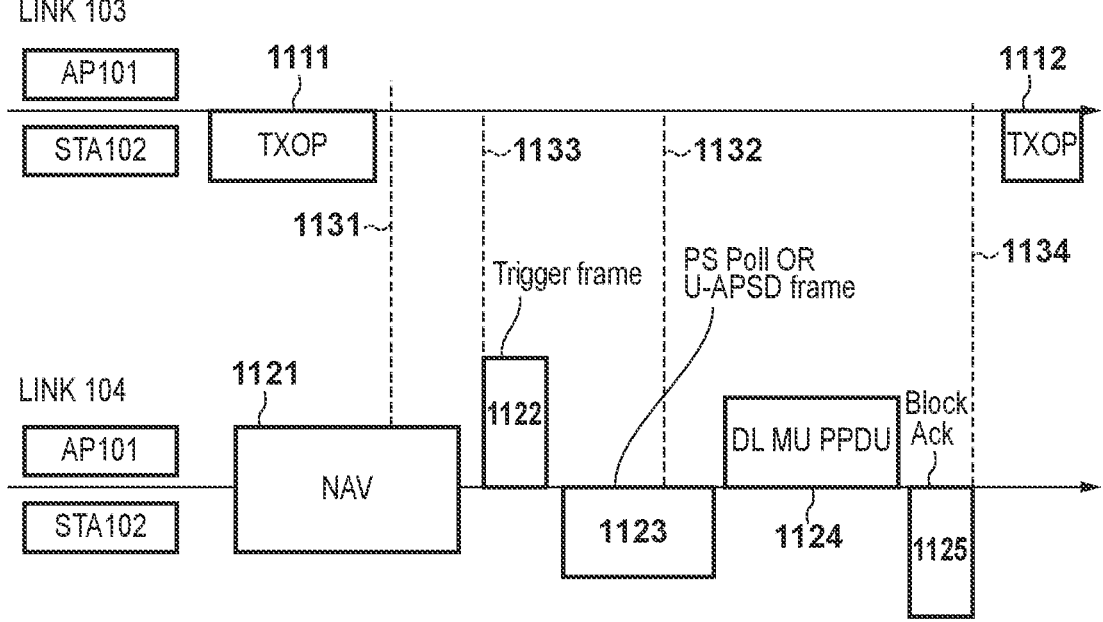
FIG. 11 is a sequence chart illustrating an example of processing performed by the AP and the STA according to a third working example.

FIG. 11 is a sequence chart illustrating an example of processing performed by the AP 101 and the STA 102 according to the present working example. FIG. 11 illustrates an example in which a trigger frame is transmitted from the AP 101 during a reception standby period, albeit at a timing/period shifted from the timing/period during which the trigger frame is originally to be received (also called a "trigger reception timing" hereinafter). In other words, this is similar to the processing examples described with reference to FIGS. 5 and 6. The trigger reception timing can be obtained by the STA 102 based on predetermined information.

The STA 102 is transmitting (uploading) data through the link 103 according to its own TXOP 1111. On the other hand, on the link 104, for example, the STA 105 (see FIG. 1) is transmitting a data frame to an AP aside from the AP 101, and a NAV period 1121 is set. The STA 102 is expected to receive a trigger frame through the link 104 at an original trigger reception timing 1131. When the trigger reception timing 1131 approaches, the STA 102 temporarily suspends uploading data.

Note that in a case where the length of the NAV period 1121 on the link 104 is known and the NAV period 1121 is known to not overlap with the trigger reception timing on the link 103, the STA 102 may continue to transmit data (the TXOP 1111) until the NAV period 1121 ends. The details of this point are as described in the first working example.

A timing 1132 indicates a timing at which to stop waiting for the reception of the trigger frame and a frame following thereafter. The STA 102 receives a trigger frame 1122 through the link 104 at a timing 1133. In response, the STA 102 returns a PS Poll (Power Save Poll) frame or a U-APSD (Unscheduled Automatic Power-Save Delivery) frame 1123 through the link 104. The AP 101 looks at the response from each STA and transmits a DL MU PPDU (Downlink Multi-user Physical Layer Protocol Data Unit) frame 1124. This is a frame transmitted to multiple STAs including the STA 102. After receiving the DL MU PPDU frame 1124, the STA 102 returns a Block Ack frame 1125. The STA 102 resumes data transmission (a TXOP 1112) at a timing 1134 at which the return of the Block Ack frame 1125 ends. Note that in a case where data to be retransmitted from the AP 101 is present, the STA 102 waits to resume the data transmission until the retransmission has ended.

FIG. 12 is a sequence chart illustrating another example of processing performed by the AP 101 and the STA 102 according to the present working example. FIG. 12 illustrates an example of a case where the reception of the trigger frame is shifted from the trigger timing and the reception standby period has passed. In other words, this is similar to the processing examples described with reference to FIGS. 8 to 10.

The STA 102 is transmitting (uploading) data through the link 103 according to its own TXOP 1211. On the other hand, on the link 104, for example, the STA 105 (see FIG. 1) is transmitting a data frame to an AP aside from the AP 101, and a NAV period 1221 is set. The STA 102 is expected to receive a trigger frame through the link 104 at an original trigger reception timing 1231. When the trigger reception timing 1231 approaches, the STA 102 temporarily suspends uploading data.

Note that in a case where the length of the NAV period 1221 on the link 104 is known and the NAV period 1221 is known to not overlap with the trigger reception timing on the link 103, the STA 102 may continue to transmit data (the TXOP 1211) until the NAV period 1221 ends. The details of this point are as described in the first working example.

A timing 1232 indicates a timing at which to stop waiting for the reception of the trigger frame. The STA 102 resumes data transmission (a TXOP 1212) in response to the timing 1232 passing, regardless of whether a trigger frame is received. In FIG. 12, a trigger frame 1222 is transmitted from the AP 101 at a timing 1233, which is later than the timing 1232. A timing 1234 corresponds to the end of the procedure for transmitting and receiving the trigger frame and the data following thereafter. However, the STA 102 is transmitting data through the link 103, and thus the trigger frame cannot be received through the link 104 in a period 1223 (not received).

The foregoing working examples assume that the AP 101 and the STA 102 access channels through EDCA (Enhanced Distributed Channel Access). However, the solution to the problem are not limited thereto. For example, the AP 101 may only allow trigger frame-based communication for the UL communication from connected STAs. In this case, channels are allocated such that there is no UL data at the timing at which a beacon is received through another link. This makes it possible for the STA to avoid situations where the beacon reception period and frame transmission overlap.

Additionally, in the second working example, in a case where the beacon cannot be received multiple times, the STA 102 may transmit an indication to that effect to the AP 101 and then establish a link on another frequency. This makes it possible to establish links in an uncongested environment, which makes it less likely that the reception of beacons will be delayed, and furthermore, the throughput can be improved by transmitting and receiving data through that link.

In this manner, according to the embodiment described above, an STA configured such that while transmission operations are underway through a given link in multi-link, reception operations cannot be performed through another link, controls the transmission operations even in a case where the timing of an arriving group addressed frame, such as a beacon, has shifted. This makes it possible to continue communication without wasting frequency resources.

According to the present invention, a technique for transmission/reception control in a case where a shift in the reception timing of a frame transmitted periodically in multi-link communication has occurred is provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus, compliant with an IEEE 802.11 series standard, and performing multi-link communication with an other communication apparatus using a plurality of links having different frequency channels, the communication apparatus comprising:

a reception unit configured to receive a first frame, that is classified as a first type, from the other communication apparatus through a first link among the plurality of links;

an obtainment unit configured to obtain, based on the first frame, information on a reception timing, of a predetermined interval, in the communication apparatus for the first frame transmitted from the other communication apparatus; and a transmission unit configured to transmit a second frame through a second link among the plurality of links, wherein the transmission unit does not transmit the second frame in a first period through the second link and does not transmit the second frame in a second period through the second link, the first period being a period from the reception timing of the predetermined interval until reception of the first frame is to be started through the first link, and the second period being a period during which the first frame is received through the first link, and wherein the first type of frames includes at least a beacon frame, and in a case where the first frame received by the reception unit through the first link is the beacon frame, the obtainment unit obtains the information on the reception timing based on a Target Beacon Transmission Time (TBTT) included in the beacon frame.

2. The communication apparatus according to claim 1, wherein after starting transmission of the second frame through the second link, the transmission unit temporarily suspends the transmission of the second frame in the first period, and resumes the transmission of the second frame through the second link in response to the first frame being received by the reception unit.

3. The communication apparatus according to claim 2, further comprising:

a determination unit configured to determine, in a case where the first frame has been received by the reception unit while the transmission of the second frame is temporarily suspended by the transmission unit in the first period and the second period, whether a third frame to be received following the first frame is present, based on the first frame, wherein in a case where the determination unit has determined that the third frame is present, the transmission unit resumes transmission of the second frame in response to the first frame and the third frame being received by the reception unit.

4. The communication apparatus according to claim 3, wherein the first frame is one of a broadcast frame or a multicast frame, and the third frame is one of a broadcast frame or a multicast frame.

5. A communication apparatus, compliant with an IEEE 802.11 series standard, and performing multi-link communication with an other communication apparatus using a plurality of links having different frequency channels, the communication apparatus comprising:

a reception unit configured to receive a first frame, that is classified as a first type, from the other communication apparatus through a first link among the plurality of links;

an obtainment unit configured to obtain, based on the first frame, information on a reception timing, of a predetermined interval, in the communication apparatus for the first frame transmitted from the other communication apparatus; and a transmission unit configured to transmit a second frame through a second link among the plurality of links, wherein the transmission unit:

does not transmit the second frame through the second link in a first period being a period from the reception timing of the predetermined interval until reception of the first frame is to be started through the first link; and in a case where the first period has passed without the first frame being received by the reception unit through the first link, transmits the second frame through the second link after the first period has passed, and wherein the first type of frames includes at least a beacon frame, and in a case where the first frame received by the reception unit through the first link is the beacon frame, the obtainment unit obtains the information on the reception timing based on a Target Beacon Transmission Time (TBTT) included in the beacon frame.

6. The communication apparatus according to claim 5, wherein the transmission unit:

temporarily suspends transmission of the second frame in the first period, after starting the transmission of the second frame through the second link; and in a case where the first period has passed without the first frame being received by the reception unit, resumes the transmission of the second frame after the first period has passed.

7. The communication apparatus according to claim 6, further comprising:

a determination unit configured to determine, in a case where the first frame has been received by the reception unit while the transmission of the second frame is temporarily suspended by the transmission unit in the first period, whether a third frame to be received following the first frame is present, based on the first frame, wherein in a case where the determination unit has determined that the third frame is present and a second period has passed from a timing at which the first frame was received without the third frame being received by the reception unit, the transmission unit resumes transmission of the second frame after the second period has passed.

8. The communication apparatus according to claim 7, wherein the first frame and the third frame are group addressed frames.

9. The communication apparatus according to claim 1, wherein the transmission unit transmits the second frame through the second link during a NAV (Network Allocation Vector) period set for the communication apparatus and the other communication apparatus in the first link.

10. A communication apparatus, compliant with an IEEE 802.11 series standard, and performing multi-link communication with an other communication apparatus using a plurality of links having different frequency channels, the communication apparatus comprising:

a reception unit configured to receive a first frame, that is classified as a first type, from the other communication apparatus through a first link among the plurality of links;

an obtainment unit configured to obtain, based on the first frame, information on a reception timing, of a predetermined interval, in the communication apparatus for the first frame transmitted from the other communication apparatus; and a transmission unit configured to transmit a second frame through a second link among the plurality of links, wherein in a case where the first frame is to be received through the first link after a first period has passed from the reception timing of the predetermined interval, the transmission unit does not transmit the second frame through the second link in a second period during which the first frame is received through the first link, and wherein the first type of frames includes at least a beacon frame, and in a case where the first frame received by the reception unit through the first link is the beacon frame, the obtainment unit obtains the information on the reception timing based on a Target Beacon Transmission Time (TBTT) included in the beacon frame.

11. The communication apparatus according to claim 10, wherein after starting transmission of the second frame through the second link, the transmission unit temporarily suspends the transmission of the second frame in the first period, and resumes the transmission of the second frame through the second link in response to the first frame being received by the reception unit.

12. The communication apparatus according to claim 11, further comprising:

a determining unit configured to determine, in a case where the first frame has been received by the reception unit while the transmission of the second frame is temporarily suspended by the transmission unit in the first period and the second period, whether a third frame to be received following the first frame is present, based on the first frame, wherein in a case where the determination unit has determined that the third frame is present, the transmission unit resumes transmission of the second frame in response to the first frame and the third frame being received by the reception unit.

13. The communication apparatus according to claim 10, wherein the first period is a period during which reception of the first frame which is to be received between the reception timing and the next reception timing is performed.

14. A control method for a communication apparatus, compliant with an IEEE 802.11 series standard, and performing multi-link communication with an other communication apparatus using a plurality of links having different frequency channels, the control method comprising:

receiving a first frame, that is classified as a first type, from the other communication apparatus through a first link among the plurality of links;

obtaining, based on the first frame, information on a reception timing, of a predetermined interval, in the communication apparatus for the first frame transmitted from the other communication apparatus; and transmitting a second frame through a second link among the plurality of links, wherein, in the transmitting, the second frame is not transmitted in a first period through the second link and the second frame is not transmitted in a second period through the second link, the first period being a period from the reception timing of the predetermined interval until reception of the first frame is to be started through the first link, and the second period being a period during which the first frame is received through the first link, wherein the first type of frames includes at least a beacon frame, and in a case where the first frame received through the first link is the beacon frame, the information on the reception timing is obtained based on a Target Beacon Transmission Time (TBTT) included in the beacon frame.

15. A control method for a communication apparatus, compliant with an IEEE 802.11 series standard, and performing multi-link communication with an other communication apparatus using a plurality of links having different frequency channels, the control method comprising:

receiving a first frame, that is classified as a first type, from the other communication apparatus through a first link among the plurality of links;

obtaining, based on the first frame, information on a reception timing, of a predetermined interval, in the communication apparatus for the first frame transmitted from the other communication apparatus; and transmitting a second frame through a second link among the plurality of links, wherein in the transmitting, the second frame is not transmitted in a first period through the second link and the second frame is not transmitted in a second period through the second link, the first period being a period from the reception timing of the predetermined interval until reception of the first frame is to be started through the first link, and the second period being a period during which the first frame is received through the first link, and in a case where the first period has passed without the first frame being received, the second frame is transmitted through the second link after the first period has passed; and wherein the first type of frames includes at least a beacon frame, and in a case where the first frame received through the first link is the beacon frame, the information on the reception timing is obtained based on a Target Beacon Transmission Time (TBTT) included in the beacon frame.

16. A control method for a communication apparatus, compliant with an IEEE 802.11 series standard, and of performing multi-link communication with an other communication apparatus using a plurality of links having different frequency channels, the control method comprising:

receiving a first frame, that is classified as a first type, from the other communication apparatus through a first link among the plurality of links;

obtaining, based on the first frame, information on a reception timing, of a predetermined interval, in the communication apparatus for the first frame transmitted from the other communication apparatus; and transmitting a second frame through a second link among the plurality of links, wherein, in the transmitting, the second frame is not transmitted in a first period through the second link and the second frame is not transmitted in a second period through the second link, the first period being a period from the reception timing of the predetermined interval until reception of the first frame is to be started through the first link, and the second period being a period during which the first frame is received through the first link, wherein the first type of frames includes at least a beacon frame, and in a case where the first frame received through the first link is the beacon frame, the information on the reception timing is obtained based on a Target Beacon Transmission Time (TBTT) included in the beacon frame.

17. A non-transitory computer readable storage medium storing a program for causing a compute to execute a control method for a communication apparatus, compliant with an IEEE 802.11 series standard, and performing multi-link communication with an other communication apparatus using a plurality of links having different frequency channels, the control method comprising:

receiving a first frame, that is classified as a first type, from the other communication apparatus through a first link among the plurality of links;

obtaining, based on the first frame, information on a reception timing, of a predetermined interval, in the communication apparatus for the first frame transmitted from the other communication apparatus; and transmitting a second frame through a second link among the plurality of links, wherein, in the transmitting, the second frame is not transmitted in a first period through the second link and the second frame is not transmitted in a second period through the second link, the first period being a period from the reception timing of the predetermined interval until reception of the first frame is to be started through the first link, and the second period being a period during which the first frame is received through the first link, wherein the first type of frames includes at least a beacon frame, and in a case where the first frame received through the first link is the beacon frame, the information on the reception timing is obtained based on a Target Beacon Transmission Time (TBTT) included in the beacon frame.

* * * * *